July 2, 1957 R. RING 2,797,976
WELL SURVEYING INSTRUMENT
Filed Dec. 3, 1953 4 Sheets-Sheet 1
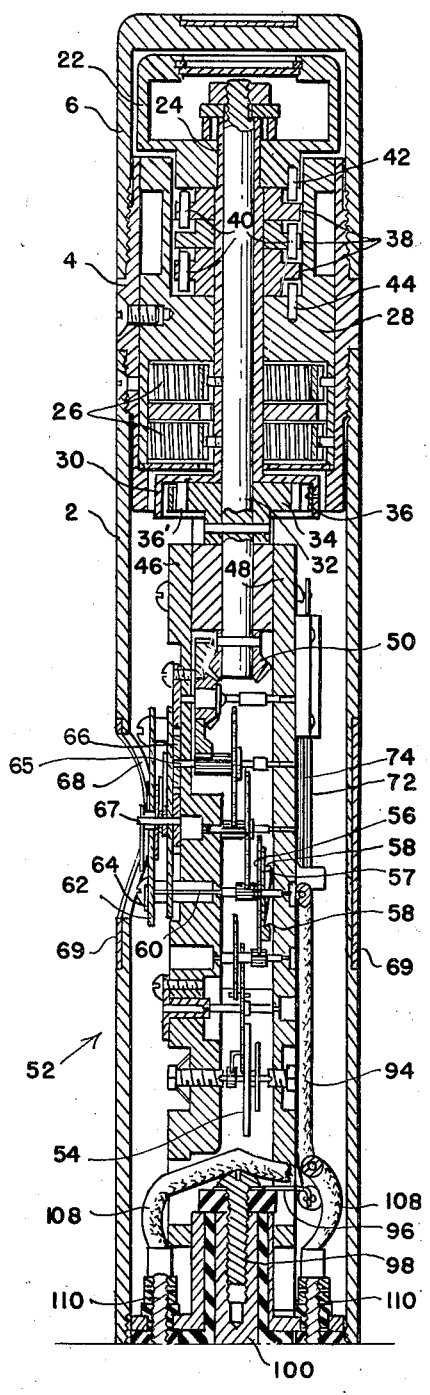
FIG. 1A.
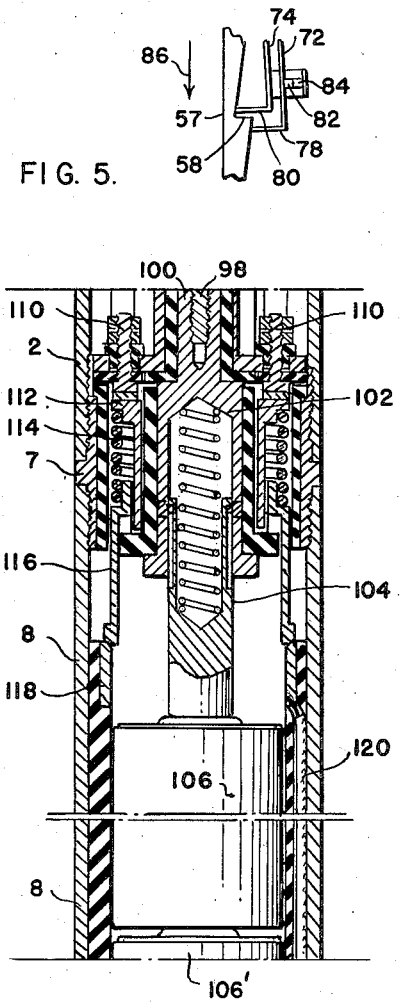
FIG. 5.
FIG. 1B.
INVENTOR.
ROLAND RING
BY
ATTORNEYS July 2, 1957

R. RING 2,797,976

WELL SURVEYING INSTRUMENT

Filed Dec. 3, 1953

INVENTOR.
ROLAND RING.
BY
ATTORNEYS

FIG. IE.

INVENTOR.
ROLAND RING

July 2, 1957 R. RING 2,797,976
WELL SURVEYING INSTRUMENT
Filed Dec. 3, 1953 4 Sheets-Sheet 4

INVENTOR.
ROLAND RING
BY
ATTORNEYS

United States Patent Office 2,797,976
Patented July 2, 1957

2,797,976

WELL SURVEYING INSTRUMENT

Roland Ring, Houston, Tex., assignor to Sperry-Sun Well Surveying Company, Philadelphia, Pa., a corporation of Delaware Application December 3, 1953, Serial No. 395,949

4 Claims. (Cl. 346—107)

This invention relates to well surveying instruments of the multiple shot type capable of providing a "continuous" survey of a bore hole or a portion thereof.

Multiple shot well surveying instruments have been in common use for the purpose of determining the inclination and direction of inclination of bore holes at spaced points along their lengths, the spacings of the points being such as to provide effectively continuous information so that the course of the bore hole may be accurately determined. Instruments of this type have been run in various fashions, on wire lines or by attachment to drill stems, in order to provide the desired surveys. Generally, however they have not been applicable to the making of surveys concurrently with drilling operations: in other words, drilling has had to be interrupted to the extent that the drill stem has to be removed from the hole prior to making the survey. The present invention relates to apparatus which may either be go-devilled into a drill stem for making a survey during the period of removal of the drill stem from a hole such as is necessary in any event for the purpose of changing bits or may be lowered into an open hole on a wire line after the drill stem has been removed therefrom. When the instrument is used during the period of removal of the drill stem, drilling is carried out to the condition requiring change of a bit. The drill stem is provided with a non-magnetic drill collar. The instrument of the present invention is go-devilled through the drill stem into the non-magnetic drill collar and then, as the drill stem is removed from the hole, records are made of both inclination and direction.

An attempt to survey a hole in this fashion with an instrument controlled from the surface of the earth would be impossible because of the fact that a cable cannot extend through the drill stem sections during removal of the drill stem since the separation of the usual fourble lengths of drill stem would be impossible.

It is an object of the present invention to provide a well surveying instrument which has a sufficiently small diameter that it may be dropped through a small size drill stem and which has capacity for making a large number of records.

It is a further object of the invention to provide an instrument which will make a predetermined number of records each minute under the control of a clock timer. By noting the time at which the record making is commenced, the time of making any of the succeeding records may be readily determined. Furthermore, by noting the elapsed time of record making and by counting the total number of records made, a check is made on the operation of the apparatus in that the number of records made over any elapsed time interval should, of course, be equal to the number of records per minute times the number of minutes involved. Furthermore, this arrangement permits the identification of records with respect to the depth at which they were made by noting, with regard to a synchronized clock at the surface of the earth, the depth at which records were made at any particular time.

These and other objects of the invention relating more particularly to the structure of the instrument will become evident from the following description when read in conjunction with the accompanying drawings, in which:

Figures 1A, 1B, 1C, 1D and 1E are axial sections taken in order from the uppermost to the lowermost portions of an instrument provided in accordance with the invention;

Figure 5 is an enlarged fragmentary showing of a portion of the apparatus shown in Figure 1A.

Figure 1C:
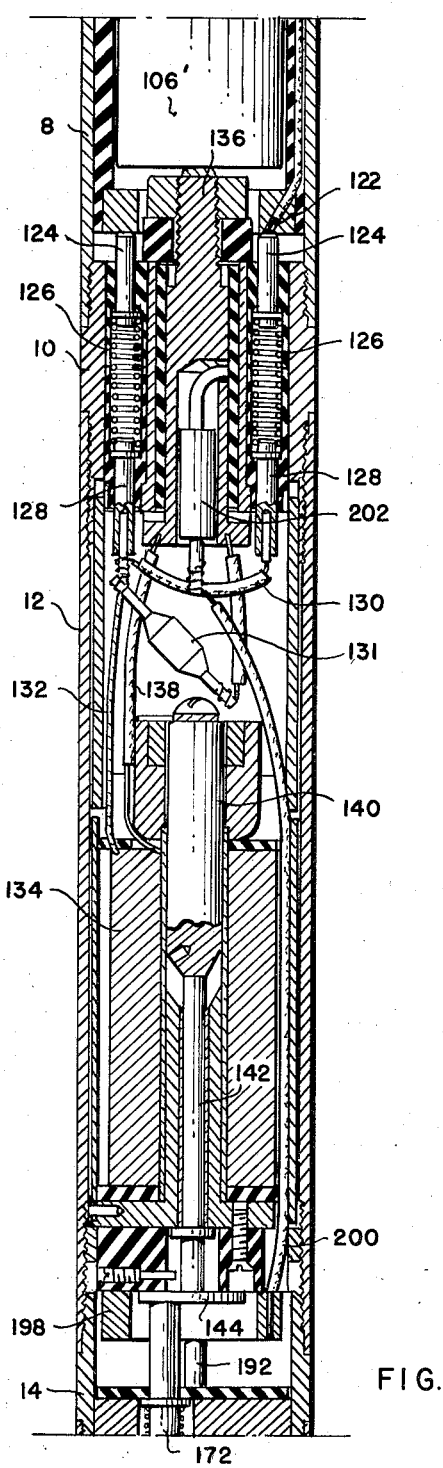
Figure 1D:
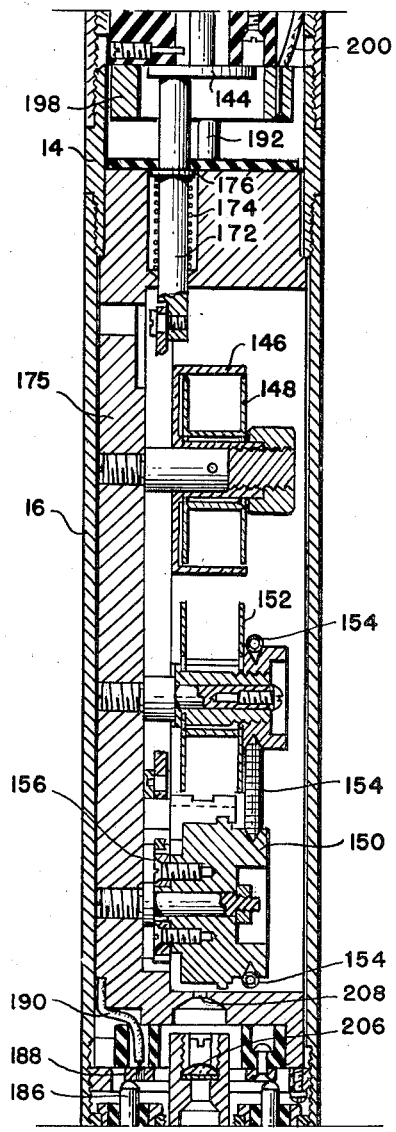
Figure 4:
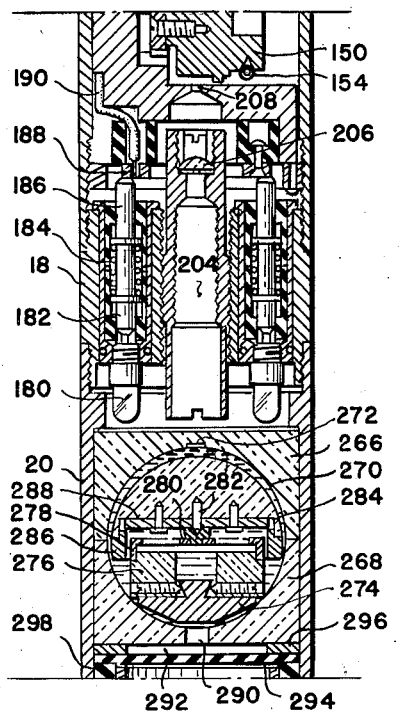
Figure 4 is a partially cut away elevation of the portion of the instrument shown in Figure 1D as viewed from the right-hand side thereof.
Figure 4:
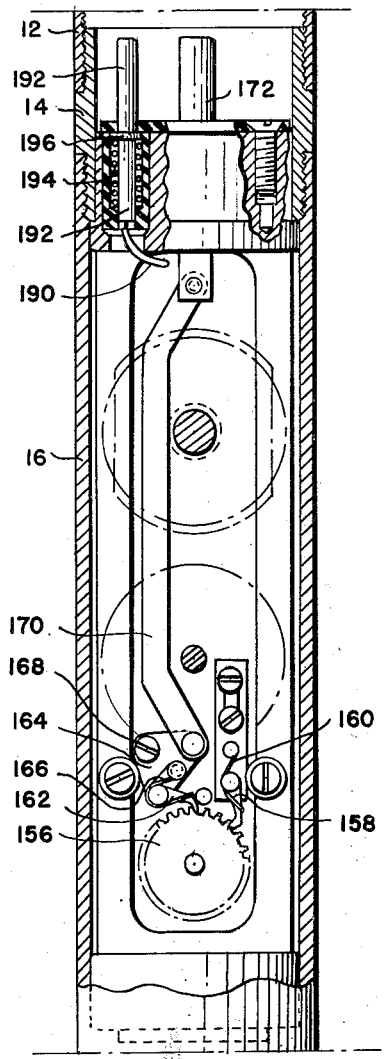

The drawings illustrate only the internal parts of the well surveying instrument, it being understood that the assembly illustrated will be located in a pressure-resistant protective casing for insertion through the drill stem. Since such protective casing, provided with the usual shock-absorbing arrangements, are well known, they will not be described herein. As will become evident from the description of the operation hereafter, a non-magnetic drill collar will be so constructed and arranged as to cooperate with the protective casing to locate it near the bottom of the drill stem in axial alignment with the drill stem. It may also be here noted that, since the instrument is of magnetic type, it is necessary not only to provide a non-magnetic drill collar, but also to provide a protective casing of non-magnetic material with the constructions of both such as to remove from the influence of the bit and portions of the drill stem which are of magnetic material the sensitive direction element which involves a magnetic compass. The portions of the instrument shown in the drawings are also non-magnetic except, possibly, for minor parts which are quite substantially removed from the compass element.

The instrument is mounted in a succession of housing tubes. The uppermost tube 2 contains a clockwork mechanism which will be described and is joined by means of a coupling 4 to a cap 6, which serves to close off the upper end of the tube string. The lower end of the tube 2 is joined by means of a coupling 7 to the upper end of a battery-containing tube 8. The lower end of the battery-containing tube 8 is joined by means of a coupling 10 to the upper end of a solenoid-containing tube 12. The lower end of the solenoid-containing tube 12 is joined by means of a coupling 14 to the upper end of a film magazine-containing tube 16. The lower end of the film magazine-containing tube 16 is joined by means of a coupling 18 to a tube 20 containing a direction-inclination sensitive device.

At the upper end of the instrument there is positioned a knob 22 which is exposed when the cap 6 is removed. The knob 22 is affixed to a sleeve 24 which extends downwardly through the upper portion of the instrument and which is affixed to the inner ends of a plurality of clock springs 26. The outer ends of the clock springs 26 are affixed to a stationary member 28 which also serves as a guide through which the sleeve 24 is rotatably passed. The lower end of the sleeve 24 is provided with a downwardly turned cup shaped portion 30. The shaft 32 is rotatably mounted within the sleeve 24. A ratchet wheel 34 is mounted on the shaft 32 within the cup portion 30 of the sleeve 24. A detent spring 36 is attached to the inner surface of the cup 30 and extends approximately 180° around the ratchet wheel 34 having an end portion thereof 36' in engagement with the ratchet teeth permitting rotation of the ratchet wheel 34 in one direction with respect to the sleeve 24 and preventing rotation thereof in the opposite direction except upon rotation of the sleeve 24. It will be evident that this structure provides for winding of the clock springs 26 by rotation of the knob 22. The driving power of the clock springs is delivered through the sleeve 24, the ratchet wheel 34 and the shaft 32.

Three discs 38 are rotatably mounted on the sleeve 24 immediately below the knob 22. Each of the discs is provided with an axially extending pin 40 and each of the pins 40 is spaced the same radial distance from the axis of rotation of the discs 38. The upper pin 40 is adapted to engage a pin 42 mounted in the knob 22 and the lowermost pin 40 is adapted to engage a pin 44 mounted in the fixed member 28. It will be evident that the arrangement of discs 38 and pins 40, 42 and 44 limits the degree of rotation of the knob 22 to approximately four revolutions and thus serves to prevent overwinding of the clock springs.

The lower end of the shaft 32 extends downwardly between a pair of plates 46 and 48 and has mounted thereon a bevelled gear 50 which serves to drive a clockwork mechanism indicated generally at 52 comprising a conventional clockwork gear train and a conventional balance wheel 54 mounted between the plates 46 and 48.

A gear 56 of the gear train is adapted to revolve one revolution per minute and carries, attached to its face, as insulated cam plate 57 having on its face three cam rise portions 58. The shaft 60 on which the gear 56 is mounted extends through the plate 46 and has affixed to its outer end an indicator hand 64. The indicator hand 64 passes above a stationary plate 62 which is marked 20–40–60 in 120° spacings below the path of the hand 64. The rises 58 of the cam 57 mounted on the gear 56 are thus established in a fixed relation with respect to the hand 64 passing above the indications 20–40–60 on the plate 62.

Figure 2:
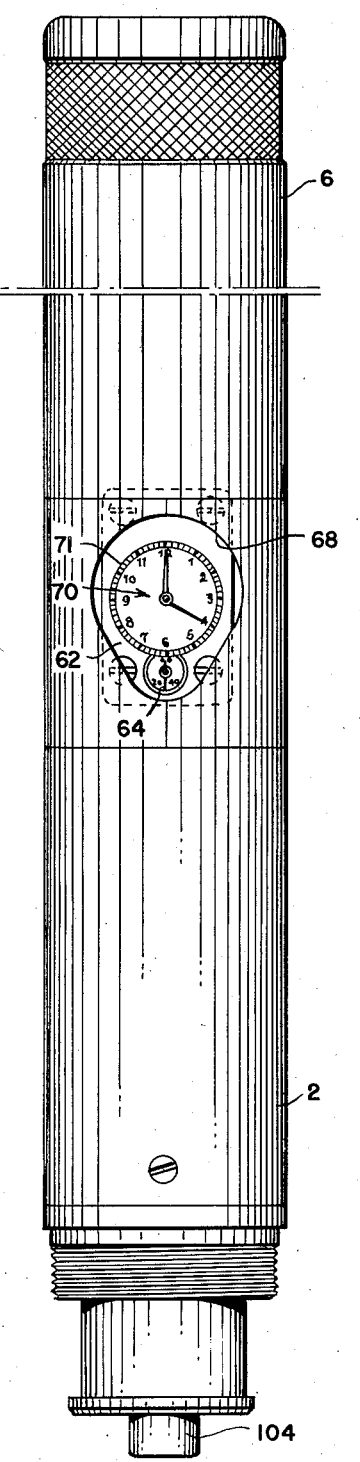
Figure 2 is an elevation of the portion of the instrument shown in Figure 1A as viewed from the left-hand side thereof.

A gear 66 mounted on the shaft 65 serves to drive a shaft 67 through a suitable pinion mounted thereon which, in turn, drives a clock minute and hour hands, as indicated at 70 in Figure 2, which pass above hourly graduations 71 on the plate 62.

The portion of the housing tube 2 immediately adjacent to the clock face and hands 64 and 70 is cut away at 68 to permit the clock hands to be viewed when the clock is assembled in the housing. The housing in this region is provided with an annular recess into which is fitted a cut away sleeve 69 which may be rotated in the recess in order to open the opening in the tube 2 to permit the clock hands to be viewed or, alternatively, to close off the opening when the instrument is to be handled or assembled into the protective casing.

Two contact arms 72 and 74 are mounted externally of the plate 48 and are held in position thereon by means of a clamping member 76. The contact arms 72 and 74 are, of course, separated from each other and from the member 76 by suitable insulating material.

Figure 3:
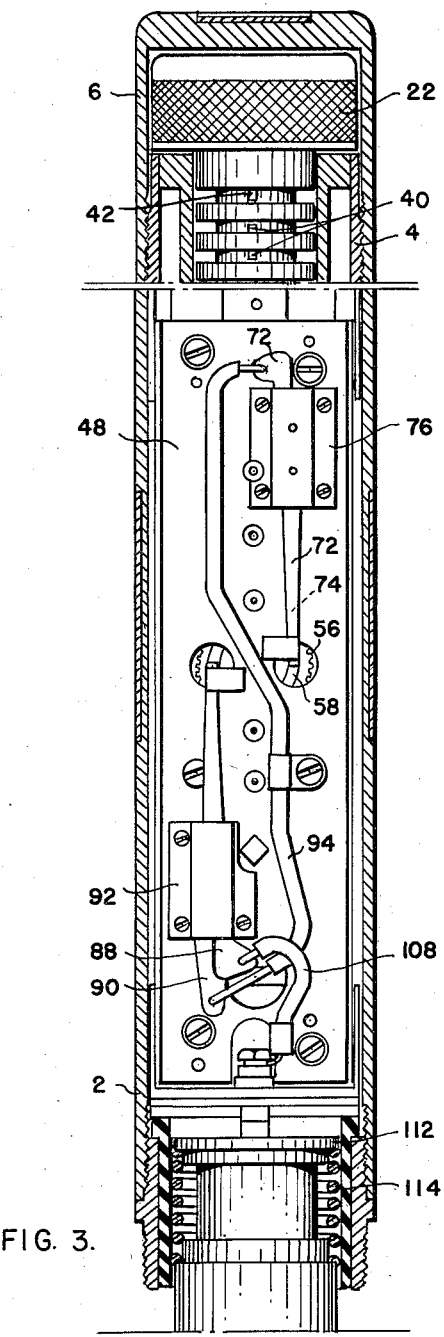
Figure 3 is a partially cut away elevation of the portion of the instrument shown in Figure 1A as viewed from the right-hand side thereof.

The lower ends of the contact arms 72 and 74 are turned inwardly through an opening in the plate 48 and terminate in portions 78 and 80, respectively, which are adapted to ride over the face of the cam 57 and be actuated by the cam rises 58. The contact arm 72 has mounted thereon a contact 82. The contact arm 74 supports a contact 84 which is positioned so as to engage the contact 82 when the arms 72 and 74 move apart. Thus, with the cam rotating in a clockwise direction as viewed in Figure 3 and as indicated by the arrow 86 in Figure 5, when the portion 80 of the contact arm 74 drops off the rise 58 of the cam the contacts 82 and 84 will close and, when the portion 78 of the contact arm 72 falls from the rise 58 of the cam the contacts 82 and 84 will open. The contacts remain open during the operating cycle except for that relatively short interval during which the portion 80 of the arm 74 has dropped off a rise 58 of the cam and the portion 78 of the arm 72 has not yet dropped off the same rise.

The two contact arms 88 and 90 are mounted externally of the plate 48 and are held in position thereon by means of a clamping member 92. The arms 88 and 90 extend upwardly from the lower portion of the plate 48 and have upper ends turned inwardly and engaging the cam 57 in a manner similar to that of the arms 72 and 74 as shown in Figure 5. The contact arms 88 and 90 support a pair of contact members similar to members 82 and 84 of the arms 72 and 74 shown in Figure 5. Thus the operation of the arms 88 and 90 and their associated contacts in response to the rotation of the cam 57 is identical to that described in connection with the arms 72 and 74. Both the arms 88 and 90 are insulated from each other and from the plate 48.

The contact arm 72 is also insulated from the plate 48 but the arm 74 is grounded thereto.

The contact arms 72 and 90 are joined by a conductor 94 which is connected to one end of a link 96, the other end of which is connected to an insulated bolt 98 forming an electrical connection with a battery 106 through an insulated member 100, a spring 102 and a member 104 which is held in engagement with the central terminal of the battery 106 by the action of the spring 102. The member 100 is mounted in an insulating bushing supported by a spacer between the lower ends of the plates 46 and 48.

The contact arm 88 is connected by means of conductor 108 to a pair of insulated pins 110 which are adapted to engage an upper outwardly extending flange of an insulated annular member 112. A circuit is formed from the pins 110 through the annular member 112, a spring 114 and a sliding annular member 116 to an insulated ring 118 mounted in the upper end of the battery housing tube 8. A conductor 120 extending for substantially the length of the battery housing tube 8 connects the ring 118 at the upper end thereof with an insulated ring 122 at the lower end thereof.

A pair of pins 124 mounted in insulating bushings within the coupling 10 are urged upwardly into engagement with the annular member 122 by means of springs 126. Pins 128 extending downwardly from the coupling 10 make contact with the springs 126 and are connected together by means of a conductor 130. A conductor 132 connects the conductor 130 to one side of a solenoid coil 134 mounted within the solenoid housing tube 12.

The lowermost battery 106′ contained within the battery housing tube 8 is connected by means of a member 136 which is insulatingly mounted within the coupling 10 and a conductor 138 to the other side of the solenoid coil 134.

A diode 131 is connected across the solenoid coil leads to prevent sparking at the contacts carried by arms 88 and 90 which control the solenoid coil energization as will be described.

A plunger 140 is mounted centrally within the solenoid coil 134 and is positioned above a downwardly extending rod 142 which mounts at its lower end a disc 144. The plunger 140, the rod 142 and the disc 144 are adapted to move downwardly when the solenoid coil is energized as a result of the action of the coil field on the plunger 140.

The film magazine contained within the magazine housing tube 16 includes a film magazine frame 175 supporting a film can 146 mounted in the upper portion of the housing within which is rotatably mounted a film spool 148. Adjacent to the lower end of the film magazine housing tube 16 is a film take-up spool 152 which is driven from a drive spool 150 by means of a spring belt 154. The film drive spool 150 has affixed thereto a ratchet wheel 156. A detent 158 is urged against the ratchet wheel 156 by means of a spring 160 to prevent retrograde motion of the ratchet.

A driving pawl 162 is pivotally mounted on a plate 164 and urged into engagement with the ratchet wheel 156 by means of a spring 166. The plate 164 is rotatably mounted on a pin 168 and is pivotally connected to a vertically extending bar 170. The upper end of the bar 170 is pivotally connected to the lower end of a rod 172 which passages through the coupling member 14 and is urged upwardly by means of a spring 174 acting between a flange 176 which is affixed to the rod 172 and the upper portion of the film magazine frame 175. The upper end of the rod 172 is adapted to engage the disc 144 previously described. Thus, it will be evident that, upon energization of the solenoid coil 134, the film will be advanced as a result of the ratchet wheel 156 being driven forward by action of the driving pawl 162. The parts are so proportioned that, upon one actuation of the solenoid coil, the film advances one frame.

A pair of lamps 180 are mounted in the coupling member 18 and extend downwardly therefrom in order to illuminate a direction-inclination sensitive device contained within the lowermost housing 20. Pins 182 are urged downwardly into engagement with the central contact of each of the lamps 180 by means of springs 184. Pins 186 are urged upwardly by the springs 184 into engagement with an insulated annular member 188 mounted in the lower portion of the film magazine housing tube 16. A conductor 190 connects the annular member 188 to a pin 192 extending upwardly from the upper portion of the film magazine frame 175. The pin is insulatingly mounted and is urged upwardly by a spring 194 acting upon a flange 196 to the pin 192.

The upper end of the pin 192 engages an insulated annular member 198 mounted in the lower portion of the solenoid housing tube 12. A conductor 200 extending upwardly from the member 198 connects the member 198 to one side of a current limiting resistance 202, the other side of which is connected to the member 136 engaging the casing of the lowermost battery 106'. Thus a contact is established between the casing of the lowermost battery and the lamps 180. The lamps 180 are grounded to their base in a conventional manner to the coupling 18.

The coupling 18 is provided with a central bore 204 within which there is mounted a lens 206. The lower end of the film magazine housing tube 16 is closed off by the film magazine frame except for a small central aperture 208 positioned immediately below the film drive spool 150. It will be evident that the lamps 180 serve to illuminate means within the housing 20 and that the lens 206 wil project an image through the aperture 208 onto the film frame above the aperture 208 positioned on the spool 150. The lens 206 is a small aperture lens and has a sufficient depth of focus that the focus is sharp over the entire field.

Below the lamps there is provided in the housing tube 20 a direction-inclination unit. This unit comprises a pair of transparent members 266 and 268, desirably of glass (though they may be of metal, the upper one being provided with a glass window), which are clamped together within tube 20 and provide a spherical chamber indicated at 270 at the top of which in the axis of the instrument there is inscribed a reference marking at 272, for example, consisting of a small circle with a cross therein. Within the spherical chamber there is located a counterweight, indicated at 274, the lower surface of which is of frustoconical shape, as indicated in the drawing. Desirably, the circular edge at the large end of the frustum is arranged to engage and rest on the spherical inner surface of the chamber while the circle at the smaller end of the frustum just clears this surface. Mounted on the counterweight 274 is the bearing support member 276 which is provided with centering screws for engagement with the counterweight to provide adjustment of the bearing support member with respect to the counterweight.

A bearing mount 278 is secured to the bearing support 276 by an annular flange and has a thin metal portion extending across the bearing support and desirably provided with large openings so as to have a slight springing action, this portion of the member 278 clearing the bearing support at its center so that it may flex slightly downwardly. At its center the member 278 carries the jewel socket 280 for the reception of the pointed end of the pin 282 secured in the hemispherical float 284 which at its lower portion carries a counterweight ring 286. Secured to the float 284, for example by pins, is a compass needle 288. The spherical chamber 270 is filled with a suitable liquid having a substantial buoyant action on the elements within the chamber. At its lower end the chamber 270 communicates with a central opening 290 leading to a space 292 above a flexible diaphragm 294 which is spaced from the member 268 by a spacing ring 296 against which it is pressed by the gasket 298 by a plug and retaining assembly mounted in the lower end of the tube 20 in a conventional fashion and not shown. Thus the chamber 270 is held in fixed position with respect to the optical system of the instrument.

The assembly, comprising the hemispherical float 284, the ring 286, the pin 282 and the compass needle 288, is constructed with respect to the liquid in the chamber 270 in which it is immersed so that its effective center of gravity is directly below its center of buoyancy so that, when the instrument is vertical, the axis of the indicating element is also precisely vertical. (By effective center of gravity there is meant the apparent center of gravity with the compass needle magnetized, this being slightly different from the true center of gravity with the needle unmagnetized.) This direction-inclination unit is more fully described in the patent to Einar T. Young, No. 2,616,187, issued November 4, 1952.

The hemispherical surface of the member 284 may carry markings which, when they assume positions with respect to the reference circle 272, will be indicative of inclination and the direction of inclination of the instrument. This surface is adapted to be illuminated by means of the lamps 180 and an image thereof projected by the lens 206 upon the film strip which is carried by the pulley 150.

When the clock is operating and the cam 57 on the gear 56 is rotating, the contacts on arms 72 and 74 are closed when the hand 64 is passing the marks 20, 40 and 60 on the plate 62. During each of these intervals, a circuit is established from ground, through the contact arm 74 to the contact arm 72 and through conductor 94, bolt 98 and member 100 to the central terminal of the uppermost battery 106. A plurality of batteries, as many as may be required to provide sufficient amounts of power for operation of the apparatus over a desired time interval, are stacked one upon the other and the lowermost battery 106' has its casing in contact with the member 136 which is connected through current limiting resistor 202, conductor 200, member 198, pin 192, conductor 190, member 188 and pins 186 and 182 to the lamps 180 which are grounded in the coupling 18. Thus each time a cam rise 58 passes beneath the contact arms 72 and 74, the lamp 180 will be momentarily illuminated. This period of illumination is approximately 3 seconds.

Approximately ten seconds after the lamps are illuminated, a cam rise 58 passes under the contact arms 88 and 90 closing the circuit between those arms. Contact arm 90 is connected to conductor 94 which is, in turn, connected to the center electrode of the uppermost battery as previously described. Contact 88 is connected through conductor 108, pins 110, members 112, 116 and 118, conductor 120, member 122, pins 124, springs 126, pins 128 and conductor 132 to one side of the solenoid coil 134. The other side of the solenoid coil is connected through conductor 138 and member 136 to the bottom of the casing of the lowermost battery 106'. Thus, each time a cam rise passes beneath the contact arms 88 and 90, the contacts of the arms close and the solenoid coil is energized. This period of energization which is timed to last for approximately one-half a second is sufficient to actuate the film advance previously described and move an unexposed film frame into position above the aperture 208. Ten seconds after the film advance is commenced, another cam rise 58 passes below the contact arms 72 and 74 and a successive exposure is made. These exposures are made at the rate of three a minute as has been described.

In operation, the well surveying instrument may be lowered into a bore hole on a wire line or run go-devil fashion through a drill stem into a non-magnetic drill collar which is positioned adjacent to the drill bit in a conventional manner. Prior to the dropping of the instrument into the drill stem or lowering of the instrument into a bore hole, the clockwork mechanism will have been wound by rotation of the knob 22 to the limit permitted by the rotation limiting discs and their pins 40 and the pins 42 and 44 as previously described. A film strip will have been loaded into the film can 146 and threaded over the film driving spool 150 and into the film take-up spool 152. At this time a clock which is retained at the surface of the earth is synchronized with the clock contained within the instrument. The exact time at which the instrument is started is noted. This includes a notation of which of the indications 20, 40 or 60 were passed by the indicator hand 64 when the first exposure was made after the clock was wound and the instrument was assembled. This first exposure on the film serves as a mark on the film from which the time of all the subsequent exposures can be ascertained. The instrument is then assembled into its protective casing and lowered into the drill stem.

During the survey the instrument clock will operate the switches so as to make a new exposure every twenty seconds. The synchronized clock retained at the surface is used to record the time at which exposures are made at any depth in the earth. At each depth at which it is desired to make recordings, the instrument will be retained at rest for a sufficient period to permit the compass to come to rest.

It will be evident that a film can such as 146 may be provided which will retain sufficient film to permit the making of a large number of records. The fact that only a small percentage of the total number of records made are made with the instrument at rest is of little consequence in that the cost of the film is only a very small fraction of the total cost of running the survey.

When the survey is completed, the instrument is removed from its protective casing and the time shown by the instrument watch and the surface clock are compared. If there is any appreciable difference, a time correction can be made during subsequent survey calculation in order that the depth at which records were made can be accurately ascertained. Before the instrument clock is removed, the last record is made and the exact time including the position of the hand 64 is noted. This, of course, will be the time of the last exposure on the film.

After the film is removed and developed, the number of pictures on the film are counted. This number of exposures should agree with the number of exposures which should have been made during the elapsed time which occurred during the making of the first exposure and the making of the last exposure as indicated by the instrument clock. If there is disagreement between the actual number of exposures and the number of exposures which should have been made, it is immediately evident that there has been an improper operation of the instrument. This is extremely valuable information in that, without it, depths at which various exposures were made could be mistakenly inferred. This procedure facilitates the discovery of improper film advance or of improper operation of the apparatus which otherwise might not be noted.

After it has been determined that the instrument has operated properly and the proper number of exposures have been made in the time interval during which the instrument was operating, the various exposures made by the instrument may be readily correlated with depth by comparing the time at which they were made with the known depth of the instrument at that time and the survey calculated in the customary fashion.

It will be evident that modifications may be made in the details of the embodiment of the invention disclosed herein without departing from the scope of the invention as set forth in the following claims.

What is claimed is:

1. A well surveying instrument comprising means adapted to be go-devilled into a drill stem including means indicating a condition in a bore hole, means including a movable record strip for recording an indication of said indicating means, means for moving said strip a predetermined length, a clock timer, means actuated by said clock timer for successively actuating said recording means and said strip moving means a predetermined number of times per minute, and means driven by said clock timer indicating the time of each actuation by said actuating means, said last mentioned means being visible from the exterior of said instrument when the instrument is in operation at the surface of the earth prior to entry of the instrument into the bore hole.

2. A well surveying instrument comprising means adapted to be go-devilled into a drill stem including means indicating a condition in a bore hole, means for illuminating said indicating means, a light sensitive strip, means for directing an image of said indicating means on a portion of said strip when said means is illuminated, means for moving said strip a predetermined length, a clock timer, means driven by said clock timer for successively actuating said illuminating means and said strip moving means a predetermined number of times per minute, and means driven by said clock timer indicating the time of each actuation by said actuating means, said last mentioned means being visible from the exterior of said instrument when the instrument is in operation at the surface of the earth prior to entry of the instrument into the bore hole.

3. A well surveying apparatus comprising means adapted to be go-devilled into a drill stem including means indicating a condition in a bore hole, means including a movable record strip for recording an indication of said indicating means, means for moving said strip a predetermined length, a clock timer, and means actuated by said clock timer for successively actuating said recording means and said strip moving means a predetermined number of times per minute, said last mentioned means comprising a cam driven by said clock and two pairs of contact arms mounted for engagement with said cam, each of said arms including a contact, the contacts of each pair of arms being constructed and arranged to engage each other after a rise of the cam has passed under a first arm of a pair permitting it to drop and before said rise has passed under the second arm of said pair permitting it to drop, the two pairs of arms being located with respect to each other and the cam so as to be actuated by the cam rises to have their contacts closed during successive and spaced intervals.

4. A well surveying instrument comprising means adapted to be go-devilled into a drill stem including means indicating a condition in a bore hole, means for illuminating said indicating means, a light sensitive strip, means for directing an image of said indicating means on a portion of said strip when said means is illuminated, means including a solenoid operated ratchet mechanism for moving said strip a predetermined length, a clock timer, means driven by said clock timer for successively actuating said illuminating means and said strip moving means a predetermined number of times per minute, said last mentioned means including a cam driven by said clock timer and two pairs of contact arms mounted for actuation by said cam, each of said arms including a contact, the contacts of each pair of arms being constructed and arranged to engage each other after a rise of the cam has passed under a first arm of a pair permitting it to drop and before said rise has passed under the second arm of said pair permitting it to drop, the two pairs of arms being located with respect to each other and the cam so as to be actuated by the cam rises to have their contacts closed during successive and spaced intervals, and means driven by said clock timer indicating the time of each actuation of one of said pair of contacts by said actuating means, said last mentioned means being visible from the exterior of said instrument when the instrument is in operation at the surface of the earth prior to entry of the instrument into the bore hole.

References Cited in the file of this patent

UNITED STATES PATENTS

| | | |
|---|---|---|
| 1,925,223 | Ahlburg | Sept. 5, 1933 |
| 2,124,892 | Nichols | July 26, 1938 |
| 2,152,671 | Smith | Apr. 4, 1939 |
| 2,255,295 | Miller | Sept. 9, 1941 |
| 2,313,310 | Arnold | Mar. 9, 1943 |
| 2,317,632 | Miller | Apr. 27, 1943 |
| 2,382,609 | Dale | Aug. 14, 1945 |

FOREIGN PATENTS

| | | |
|---|---|---|
| 482,616 | Germany | Sept. 24, 1929 |